April 28, 1959 R. R. DE BOLT ET AL 2,884,365
pH ELECTRODE HOLDER
Filed March 5, 1957 2 Sheets-Sheet 1

INVENTORS
RICHARD R. DE BOLT
BRUCE E. POWELL
BY
ATTORNEYS

April 28, 1959   R. R. DE BOLT ET AL   2,884,365
pH ELECTRODE HOLDER
Filed March 5, 1957   2 Sheets-Sheet 2
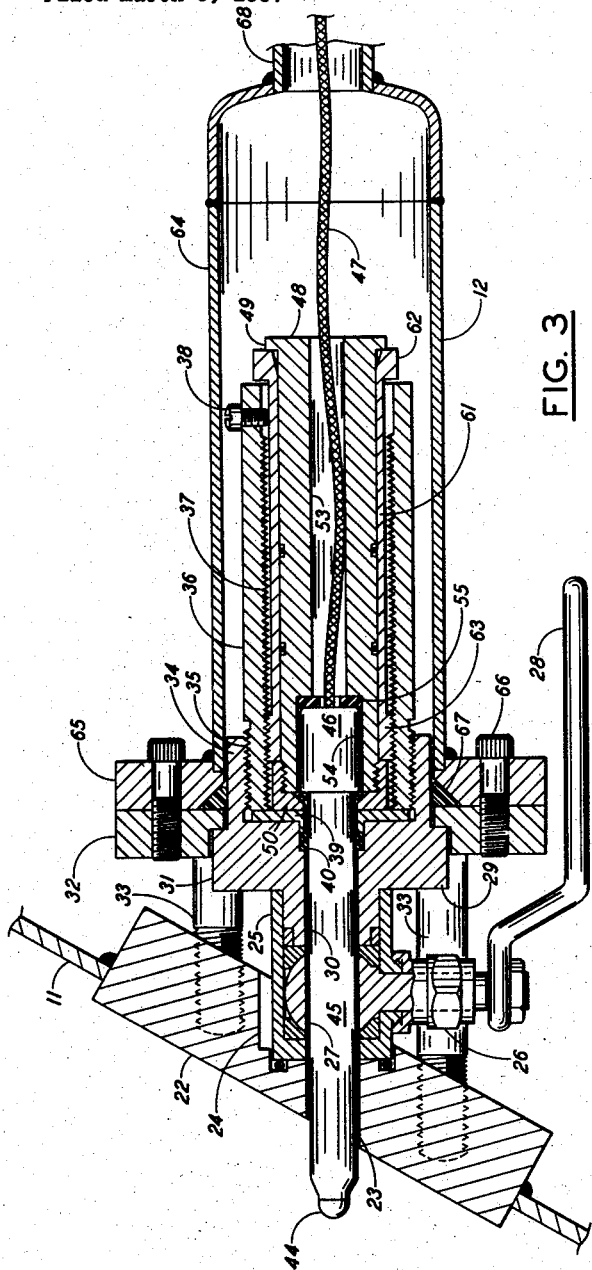
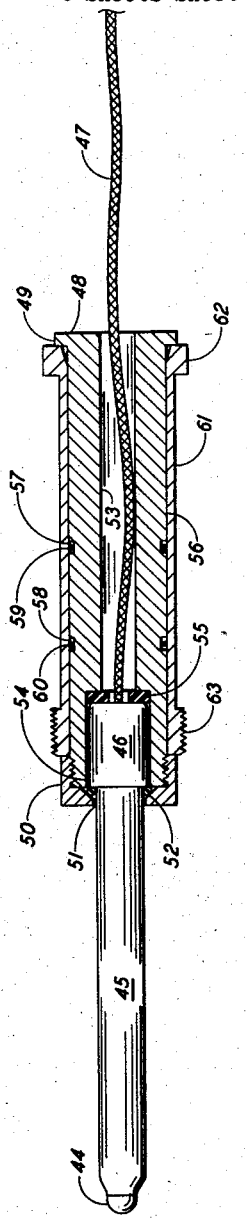
INVENTORS
RICHARD R. DE BOLT
BRUCE E. POWELL
BY
ATTORNEYS

United States Patent Office 2,884,365
Patented Apr. 28, 1959

2,884,365 pH ELECTRODE HOLDER

Richard R. De Bolt, Pinole, and Bruce E. Powell, El Sobrante, Calif., assignors to California Research Corporation, San Francisco, Calif., a corporation of Delaware Application March 5, 1957, Serial No. 644,089

7 Claims. (Cl. 204—195)

This invention relates to apparatus for positioning a pH glass electrode or a liquid junction tube in a container, and particularly refers to a retractor arrangement for positively introducing or withdrawing the electrode or tube in a completely sealed condition, so that leakage of the fluid contents of the container will not occur.

The determination of pH or hydrogen ion concentration is an essential factor in the successful operation of many chemical reactions. These may be carried out under pressure and at elevated temperatures. The nature of the pH glass electrode and the liquid junction tube is such that they are quite fragile and require accurate means for positioning them, as well as for protecting them from shocks and breakage when they are introduced or withdrawn from a reactor.

It is an object of this invention to provide an improved means for carrying out the above-mentioned purpose, namely, to provide an improved holder for a device of this kind.

Another object is to provide a holder which may be aligned with a valved aperture in the wall of a vessel reactor, or other container, so that the pH glass electrode or liquid junction tube may be introduced or withdrawn without loss of fluid contents from the container.

These and other objects and advantages of the invention will be apparent from the following description and the attached drawings, which illustrate preferred embodiments as applied to a mixing reactor operated at moderate pressure. For convenience in description, the term "electrode" as used herein will be understood to mean either the pH glass electrode or the usual liquid junction tube commonly employed in hydrogen ion determinations.

In the drawings,

Figure 3 is a vertical sectional view of a holder of substantially the same construction as that of Figure 2, but modified to accommodate a pH glass electrode.

Figure 4 is a detail longitudinal sectional view of the retractor element of Figure 3.

Figure 1:
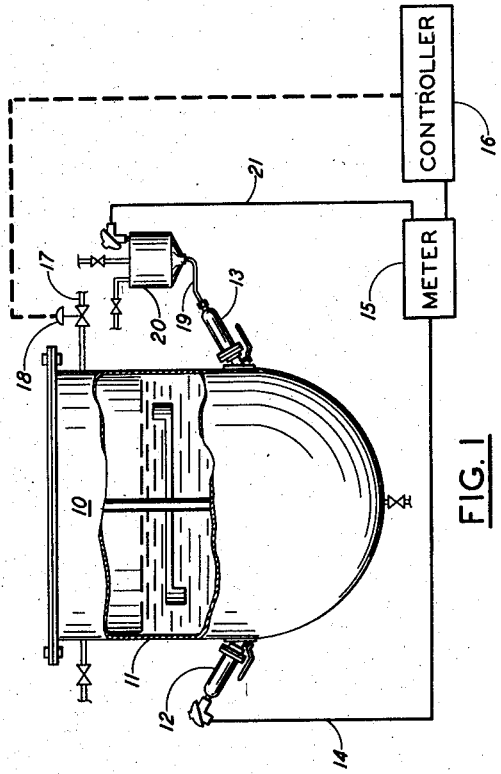
Figure 1 is a schematic vertical elevation, partly in section, showing the arrangement of an exemplary reactor with the electrode holders in place therein.

In Figure 1 of the drawings, reference numeral 10 designates generally a closed mixing reactor having a shell 11 to which the pH glass electrode holder 12 and the liquid junction tube holder 13 are secured. For convenience in representation, these are illustrated as being on opposite sides of reactor 10. In practice, they will be located at substantially the same level and as close together as is convenient.

Leading from the pH glass electrode holder 12 is the conventional wiring 14 connecting it to the pH meter 15. If desired, that meter may be connected in turn to a controller, so that flow of a pH-modifying reagent to reactor 10 through line 17 may be controlled by a valve generally designated 18.

Liquid junction holder 13 is connected by the usual conduit 19 to a container 20 adapted to feed a small stream of a reference electrolyte solution, for example, potassium chloride, as is customary in such installations. An electrical connection 21 leads from container 20 to pH meter 15.

Figure 2:
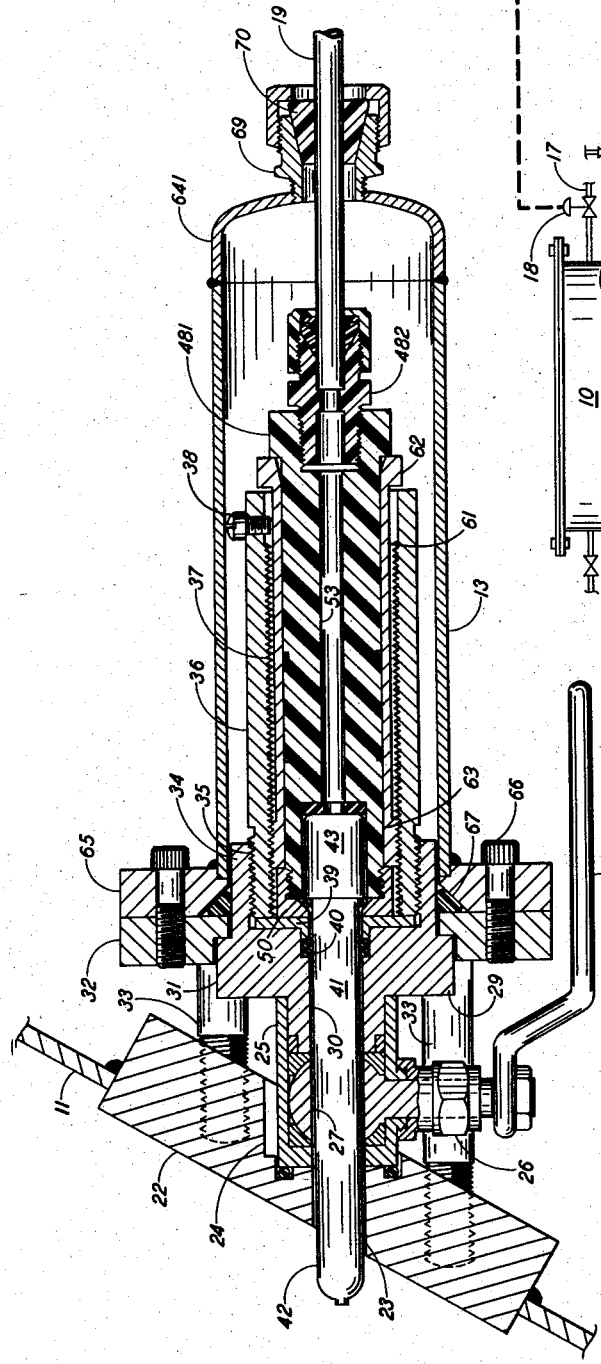
Figure 2 is a vertical sectional view of a preferred form of holder with a liquid junction tube (electrode) in place therein. For convenience, the holder is illustrated as being horizontal, whereas, it is actually inclined downwardly at about a 30° angle.

Referring now to Figure 2, there is illustrated the shell 11 of reactor 10 which, in this case, is provided with a relatively thick base portion 22 through which a bore 23 extends. A counterbore 24 is adapted to receive a cup 25 for a ball valve generally designated 26. The bore 27 of valve 26 is of substantially the same diameter as 23 and is adapted, by means of valve handle 28, to be aligned with that bore or to close it off completely by rotating the handle through 90°.

An annular member 29 is reduced in diameter at one end to be received in cup 25, and is provided with a bore 30 aligned with bores 23 and 27. The rim 31 of annular member 29 is overlapped by an annular flange 32, which may be rigidly secured to base 22 by means of threaded studs 33 and appropriate nuts (not shown) to hold the parts already described in rigid alignment and in liquid-tight relation.

In this example, the outer face of annular member 29 is provided with a cylindrical portion 34 which is threaded at 35 to receive an elongated sleeve 36, which is internally threaded at 37 substantially throughout its length. A stop screw 38 is provided near the outer end of sleeve 36 for reasons which will be explained below. At the inner end of sleeve 36 is a flanged washer 39 provided with O rings 40 for sealing the space between body 41 of the liquid junction tube generally designated 42 and bore 30. The enlarged base 43, generally of metal, of tube 42 has an appropriate inlet aperture (not shown) for admitting the reference electrolyte, in this case potassium chloride solution, to the body 41 of the liquid junction tube, from which it flows slowly out of the tube tip into reactor 10, as is well known in this art.

Referring now to Figure 4, which shows in detail the retractor structure to be described below, that figure illustrates a pH glass electrode generally designated 44, consisting of a glass body 45 and an enlarged base 46. Wires 47 extend from base 46 to connect to leads 14 connected to pH meter 15. The retractor structure for the glass electrode consists of a hollow metal cylinder 48, flanged at its outer end 49 and provided at its inner end with a threaded cap 50. The bore 51 of cap 50 closely surrounds body 45 of electrode 44 and is conveniently provided with an O ring 52. The central bore 53 of cylinder 48 is enlarged at 54 to accommodate the enlarged base 46 of the electrode, so that the base is clamped between a resilient gasket 55 and the O ring 52 to retain the electrode rigidly within cylinder 48.

The outer portion of cylinder 48 between cap 50 and flange 49 forms an elongated groove 56, recessed at 57 and 58 to accommodate O rings 59 and 60. In this groove is received what may be termed an elongated nut 61 provided with a hexagonal portion 62 at its outer end and a short threaded portion 63 at its inner end. The essential features of the retractor just described are the same for both the pH glass electrode holder and the liquid junction tube holder, with one significant difference. The latter, 481, should be made, as illustrated in Figure 2, of an electrical insulating material, for example, nylon. In addition, there is provided a compression coupling 482, also of electrical insulating material, to connect the bore 53 of the cylinder with the nylon tubing 19, which carries the reference solution from the container 20 to the liquid junction tube 42, and also acts to conduct electric current from the tube tip.

In order to protect the foregoing arrangements against external damage, it is desirable, although not necessary, to provide external housing which may consist of a shell 64 and a flange 65 secured by appropriate screws 66 to flange 32, previously mentioned. Desirably, a sealing gasket 67 is provided to be compressed between the last-named flanges and the outside of the cylindrical portion 34 of annular member 29, as shown. In the case of the housing for the glass electrode holder, it is convenient to provide a reduced diameter conduit 68 at the outer end of the housing shell 64 to protect the electrical leads 47, as shown in Figure 3. The corresponding housing shell 641 for the liquid junction is desirably provided with a packing gland generally designated 69, with a resilient gasket 70 to be compressed around the reference electrolyte tubing 19 and make a tight seal therewith.

To assemble either one of the foregoing devices with ball valve 18 in a closed position, i.e., at right angles to that shown in Figures 2 and 3, reference is made to Figure 4 of the drawings, which illustrates how either the pH glass electrode 44 or the liquid junction tube 42 is placed in the retractor assembly of that drawing. Cap 50 is removed from cylinder 48 and the enlarged end 46 or 43, respectively, of the electrode is placed in the enlarged bore 54 of cylinder 48. Cap 50, with O ring 52, is then installed as shown. This provides an intermediately enlarged bore in the retractor which will exert a positive force either to urge the electrode through bore 30, or to retract it therefrom.

The retractor assembly of Figure 4 is then threaded into sleeve 36 after stop screw 38 has been backed off to permit the threaded end 63 of retractor nut 61 to engage the threads 37 of sleeve 36. As the inner end of the electrode passes O rings 40, a tight seal is made between the body 45 or 41 of the electrode and the bore 30 of annular member 29. After such engagement is made, ball valve 26 is turned to the position shown by means of handle 28, whereupon continued rotation of nut 61 will positively urge the electrode through bores 27 and 23 to project into the shell 11 of reactor 10. As soon as the electrode is completely inserted, stop nut 38 is turned to the position shown in Figures 2 and 3, which will prevent inadvertent retraction of the electrode if the valve 26 should be accidentally left open when the electrode is being withdrawn.

Although single embodiments of this device adapted for either a pH glass electrode or a liquid junction tube have been illustrated and described, it is obvious that numerous changes could be made without departing from the essential features of this invention. Accordingly, all such modifications and changes that fall within the scope of the appended claims are intended to be embraced thereby.

We claim:

1. A device for removably positioning a pH glass electrode or the like having a cylindrical portion with an enlarged base, in a valved aperture extending through the wall of a container, comprising an annular member aligned with said aperture, means for securing said member to the outside of said container wall, an elongated internally threaded sleeve externally threaded at its inner end so as to be threaded into said annular member and extending outwardly from said wall and said container, an elongated retractor nut having an externally threaded portion at its inner end to be received inside said threaded sleeve, and a flattened rotatable head at its outer end, a hollow cylindrical retractor member provided with enlarged means at its ends forming therebetween a circumferential groove for said retractor nut to be rotatably mounted therein, said member being movable thereby selectively to be drawn into said sleeve and to be extended out of said sleeve, and a threaded cap at the inner end of said retractor member for securing the enlarged base of said electrode to the end of said member so that the cylindrical portion extends axially therefrom, the lengths of said sleeve, nut, and retractor member being greater than the length of that part of the electrode that extends through said valve, so that, when said retractor member is partially withdrawn from said sleeve, said valve may be closed.

2. A device according to claim 1, with the addition of sealing means in said annular member for the body of said electrode while it is in place therein.

3. A device according to claim 1, with the addition of stop means in said sleeve for selectively preventing complete withdrawal of said retractor and electrode from said annular member as said nut is rotated to withdraw said electrode from said container.

4. A device according to claim 1, in which the enlarged bore of said retractor member is formed by a removable packing nut threaded onto said member to retain the enlarged base of said electrode, and includes sealing means for each end of said base to prevent entry of liquid from said container to the bore of said hollow retractor member.

5. A device according to claim 1, in which said retractor member comprises an electrical insulator and includes a fluid passage for conveying an electrolyte to said electrode.

6. A device according to claim 1, with the addition of fluid sealing means between said retractor body and said retractor nut.

7. A liquid junction tube for pH determination and adapted to be used with a retractable holder engaging an enlarged base at one end of said tube, said holder adapted selectively to insert and withdraw the other end of the tube through an opening in a closed vessel; said tube comprising a hollow insulating body of substantially uniform diameter, a liquid outlet at one end of said body, a substantially flat-faced base of larger diametre than said body at the other end of said tube, and means forming a liquid inlet in the end face of said base, said inlet also constituting an electrical connection for electrically conductive liquid in said body.

References Cited in the file of this patent

UNITED STATES PATENTS

| | | |
|---|---|---|
| 2,186,924 | Hooper et al. | Jan. 9, 1940 |
| 2,498,232 | Andrews | Feb. 21, 1950 |
| 2,617,302 | Massiot | Nov. 11, 1952 |
| 2,697,070 | Arthur | Dec. 14, 1954 |
| 2,758,081 | Iknayan | Aug. 7, 1956 |

FOREIGN PATENTS

| | | |
|---|---|---|
| 903,905 | France | Feb. 5, 1945 |